US012241432B2

(12) United States Patent
Worthington

(10) Patent No.: US 12,241,432 B2
(45) Date of Patent: Mar. 4, 2025

(54) MULTIFUEL CLOSED-LOOP THERMAL CYCLE PISTON ENGINE, SYSTEM AND METHOD

(71) Applicant: Engine Development Corp, LLC, Spring Valley, CA (US)

(72) Inventor: Ralph T. Worthington, Spring Valley, CA (US)

(73) Assignee: Engine Development Corp, LLC, Spring Valley, CA (US)

(*) Notice: Subject to any disclaimer, the term of this patent is extended or adjusted under 35 U.S.C. 154(b) by 0 days.

(21) Appl. No.: 18/576,285

(22) PCT Filed: Jul. 14, 2022

(86) PCT No.: PCT/US2022/037158
§ 371 (c)(1),
(2) Date: Jan. 3, 2024

(87) PCT Pub. No.: WO2023/003753
PCT Pub. Date: Jan. 26, 2023

(65) Prior Publication Data
US 2024/0151193 A1    May 9, 2024

Related U.S. Application Data

(60) Provisional application No. 63/224,104, filed on Jul. 21, 2021.

(51) Int. Cl.
*F02G 3/02*    (2006.01)
*F02D 41/04*    (2006.01)
(Continued)

(52) U.S. Cl.
CPC ............. *F02G 3/02* (2013.01); *F02D 41/045* (2013.01); *F02D 41/401* (2013.01);
(Continued)

(58) Field of Classification Search
CPC ........ F02D 2041/001; F02G 3/00; F02G 3/02; F02G 2254/10; F02G 2270/90;
(Continued)

(56) References Cited

U.S. PATENT DOCUMENTS 3,577,729 A * 5/1971 Warren ..................... F02G 3/02
60/729
3,919,840 A   11/1975 Markowski
(Continued)

OTHER PUBLICATIONS

International Searching Authority, Written Opinion of the International Searching Authority for PCT/US2022/037158 dated Oct. 28, 2022, 6 pages.
(Continued)

*Primary Examiner* — Hung Q Nguyen
*Assistant Examiner* — Mark L. Greene
(74) *Attorney, Agent, or Firm* — Frederic Dorwart, Lawyers PLLC; Penina Michlin

(57) ABSTRACT

A multifuel closed-loop thermal cycle piston engine, system and method. An externally-fired continuous combustion piston-driven engine configured to employ water injection post combustion to maintain a temperature of exhaust gas at a set point to form a closed-loop thermal cycle. A multifuel closed-loop thermal cycle piston engine includes a drive stage, a compression stage separate from the drive stage, the compression stage including a pressure-operated exhaust valve of a compression cylinder, an externally-fired continuous combustion chamber configured to conduct continuous combustion of a nonselective fuel, the combustion chamber comprising a water injection stage succeeding the fuel burner chamber, the water injection stage configured to inject water into the combustion chamber post-combustion, and wherein a quantity of water injected post-combustion is configured to maintain engine exhaust at or below a temperature set point.

15 Claims, 11 Drawing Sheets

(51) Int. Cl.
*F02D 41/40* (2006.01)
*F02D 41/00* (2006.01)

(52) U.S. Cl.
CPC .... *F02D 2041/001* (2013.01); *F02G 2254/10* (2013.01); *F02G 2270/90* (2013.01)

(58) Field of Classification Search
CPC .. F01L 1/462; F02M 3/00; F02M 3/02; F02M 25/025–03
USPC ...... 60/775, 39.53, 39.55, 39.59, 39.6–39.63
See application file for complete search history.

(56) References Cited

U.S. PATENT DOCUMENTS

| | | | | |
|---|---|---|---|---|
| 4,212,162 | A | * | 7/1980 | Kobayashi ................ F02G 1/02 123/3 |
| 4,805,571 | A | * | 2/1989 | Humphrey .......... F01L 13/0057 123/316 |
| 5,311,739 | A | | 5/1994 | Clark |
| 5,964,087 | A | | 10/1999 | Tort-Oropeza |
| 6,032,460 | A | | 3/2000 | Pahl |
| RE43,252 | E | * | 3/2012 | Ginter .................. F01K 21/047 60/39.55 |
| 8,931,282 | B2 | * | 1/2015 | Feinstein ............. F02M 25/028 60/729 |
| 2007/0289562 | A1 | | 12/2007 | Zajac et al. |

OTHER PUBLICATIONS

Korean Intellectual Property Office (KIPO/ISA), International Search Report for PCT/US2022/037158 dated Oct. 28, 2022, 4 pages.

* cited by examiner

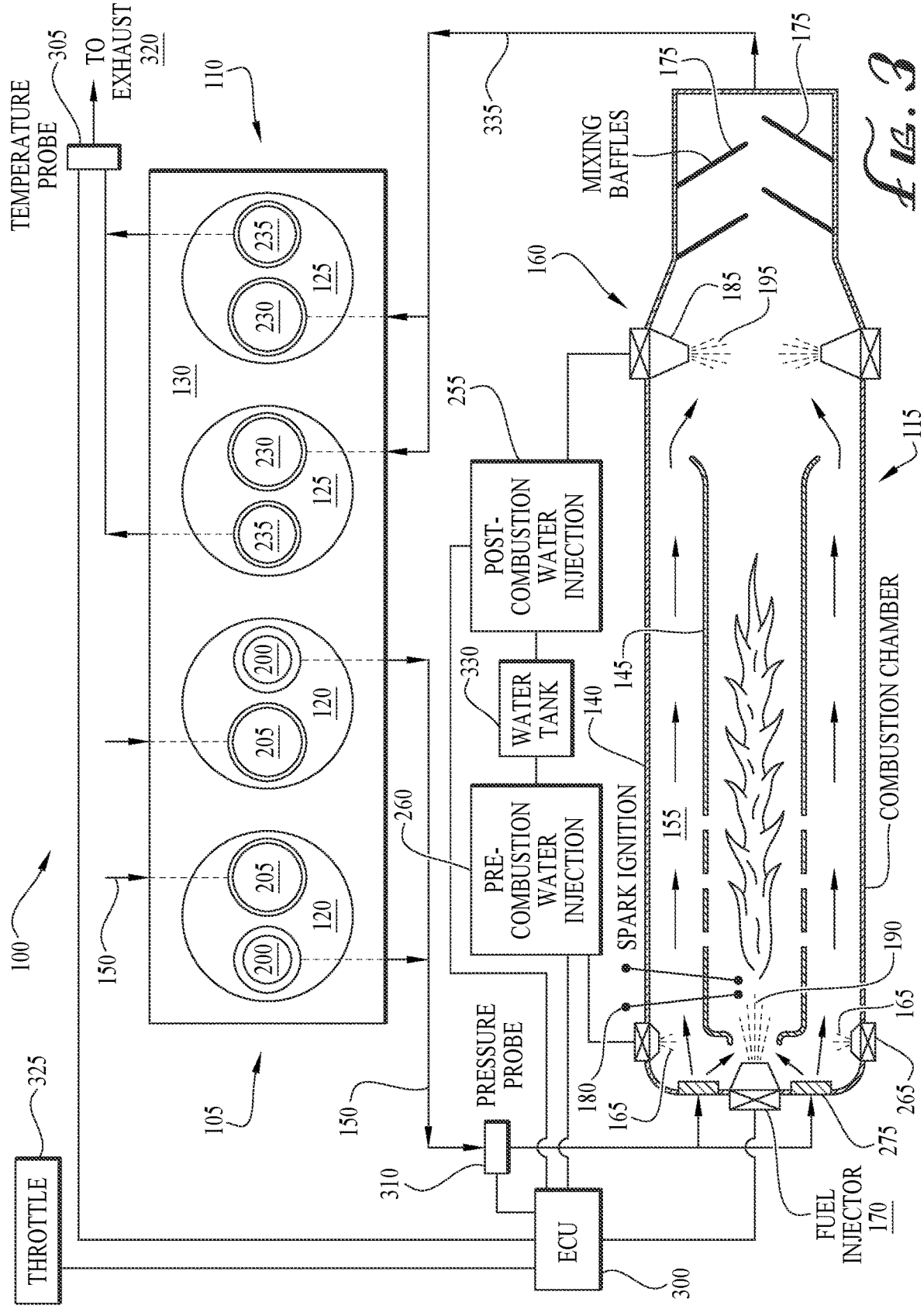

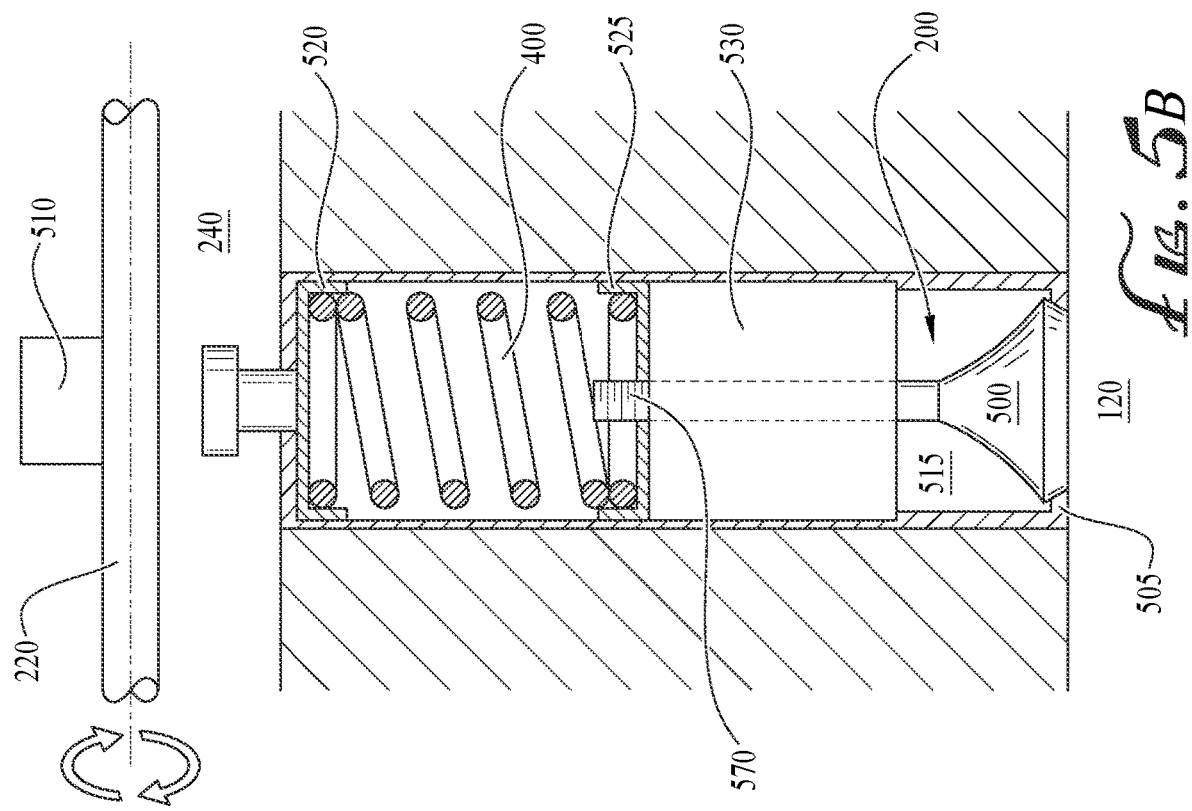
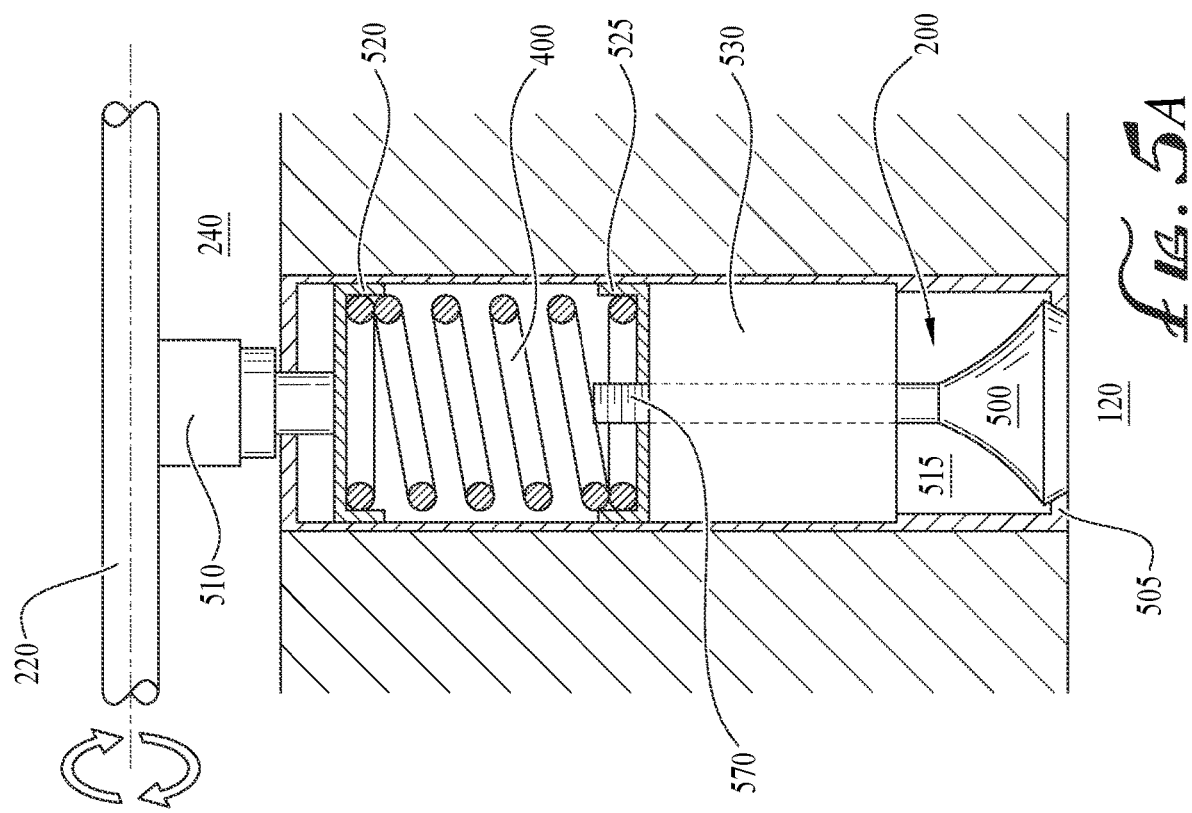

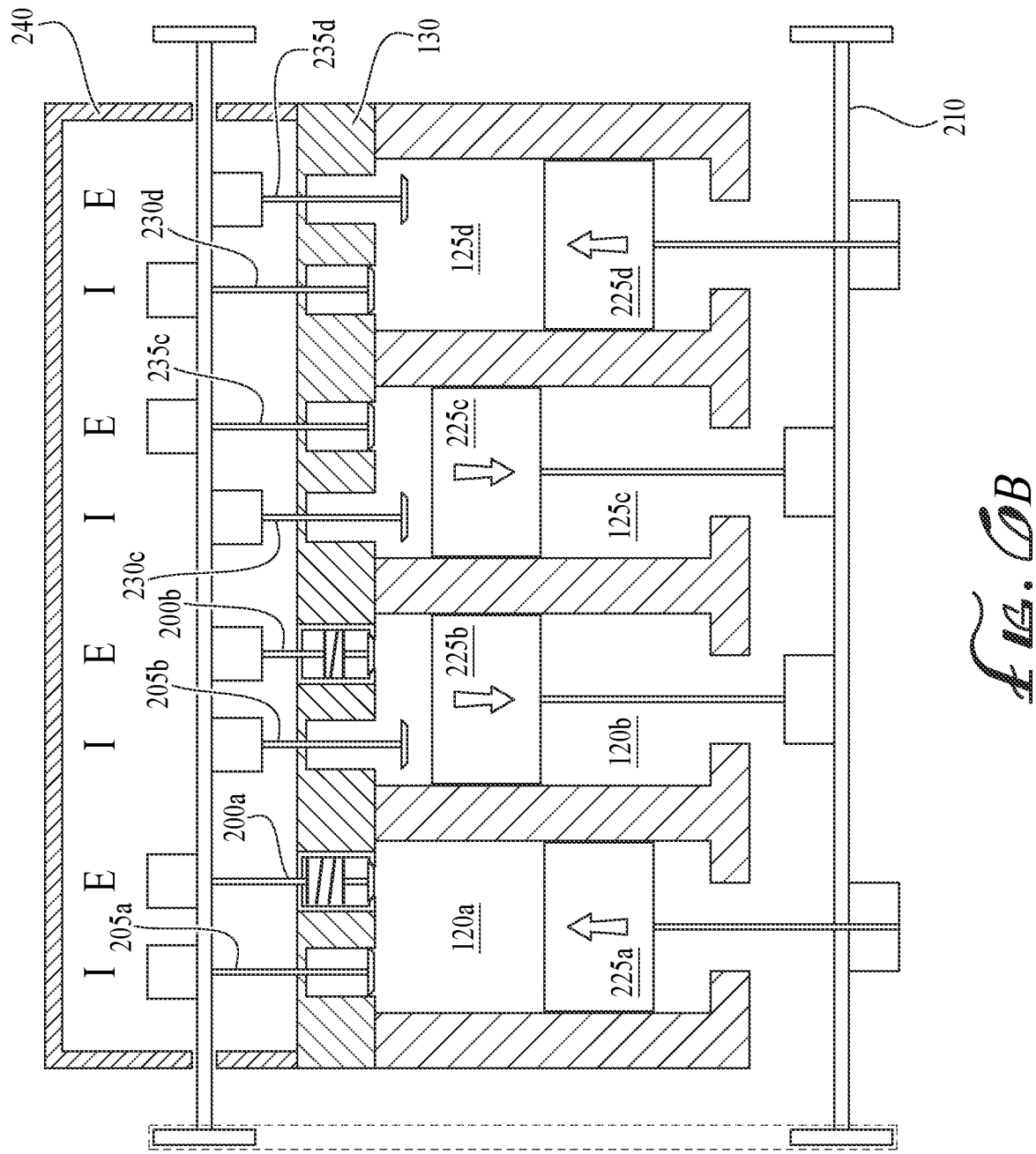

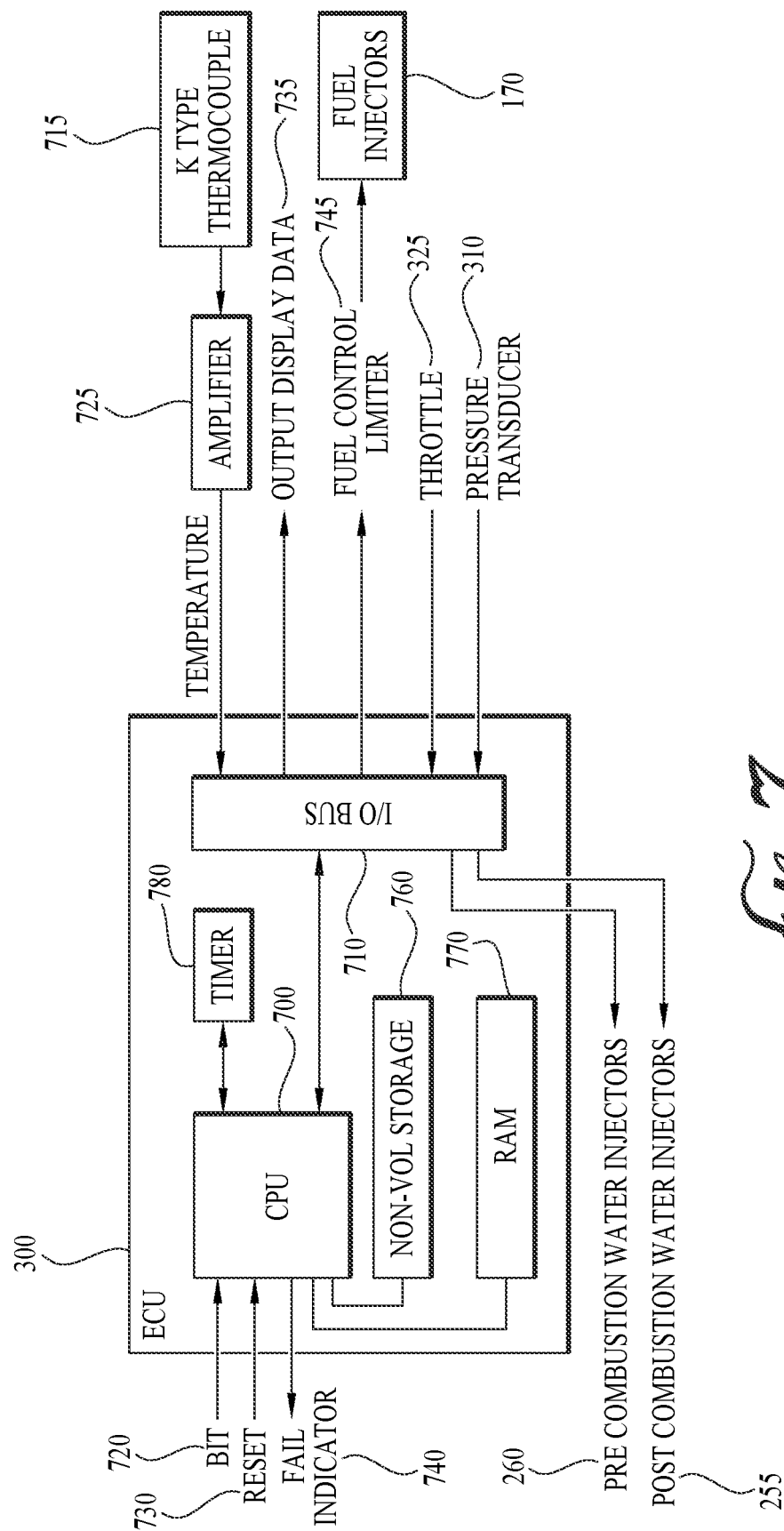

MULTIFUEL CLOSED-LOOP THERMAL CYCLE PISTON ENGINE, SYSTEM AND METHOD

BACKGROUND

1. Field of the Invention

Embodiments of the invention described herein pertain to the field of piston engines. More particularly, but not by way of limitation, one or more embodiments of the invention enable a multifuel closed-loop thermal cycle piston engine, system and method.

2. Description of the Related Art

In the context of motor vehicles, such as cars, trucks, trailers, buses, utility vehicles, motorcycles, farming and construction vehicles and the like, fuel economy is of significant importance. Not only is gasoline expensive, but better fuel economy reduces carbon dioxide emissions (carbon footprint) thereby reducing climate change, increases energy sustainability and reduces oil dependence costs, among other benefits. For these reasons, increasingly, hybrid electric vehicles and plug-in hybrid vehicles have grown in popularity. Unfortunately, these hybrid vehicles merely displace greenhouse gas emissions from the car tailpipe exhaust to the generators powering the electricity grid, which still produce emissions and bear energy costs in order to generate power to charge the vehicle battery. In addition, hybrid vehicles are more expensive to produce and maintain as compared to gasoline fueled engines.

A small to medium sized automobile typically includes an internal combustion engine or an electric motor, or some combination of the two. Internal combustion engines employ pistons with intermittent combustion also referred to as "batch fired engines", such as a four-cylinder piston engine. Piston engines are also known as reciprocating engines. A conventional automotive vehicle with an internal combustion engine gets about 25 miles per gallon (MPG), while the engine develops about 20 brake horsepower (BHP) and consumes 2.5 gallons per hour (GPH) at freeway speed. Therefore, the amount of thermal energy being used is about 51,000 BTU while 300,000 BTU is being created. The approximately 250,000 BTU of heat energy remaining is predominantly dumped into the environment and wasted.

Some success has been realized in recovering energy from the exhaust of turbine engines to improve the efficiency of the engine. Dr. Dah Yu Cheng is credited with the development of a turbine engine employing energy recovery from the exhaust in what is known as the "Cheng Cycle". Cheng Cycle turbines are widely used as high efficiency engines in the electric power generating industry, but unfortunately, a system that incorporates a similar principle into a small piston engine, such as that needed for a motor vehicle, has never been successfully developed.

In addition, most internal combustion engines require a specific type of fuel, whether it be gasoline or diesel, causing oil dependence and reliance on a non-renewable resource. Although some bi-fuel vehicles exist, these typically rely on gasoline blended with ethanol. Therefore, although bi-fuel vehicles can accept a mixture of two fuels in more flexible proportions than typical gasoline vehicles, such flexible-fuel vehicles still have limitations in that they have substantially reduced performances. In addition, these vehicles ultimately require a specific fuel combination, such as gasoline blended with ethanol. Some vehicles are capable of running on natural gas and others on hydrogen, but availability of these fuel sources is not-yet widespread and therefore limited from wide commercial adoption.

Attempts have been made to solve the problems caused by internal combustion engine vehicles by using electric vehicles. Unfortunately, electric vehicles have disadvantages such as a shorter range than gas-powered cars, recharging the battery is time consuming, they are generally more expensive than gas-powered cars, the batteries require periodic replacement, and the source of electricity used to charge the battery may not be from a renewable resource, which displaces the carbon emissions but does not solve the underlying problems.

As is apparent from the above, conventional motor vehicle engines suffer from several disadvantages including low thermal efficiency and low fuel economy. Therefore, there is a need for a multifuel closed-loop thermal cycle piston engine, system and method.

SUMMARY

One or more embodiments of the invention enable a multifuel closed-loop thermal cycle motor vehicle engine, system and method.

A multifuel closed-loop thermal cycle motor vehicle engine, system and method is described. An illustrative embodiment of a motor vehicle system includes an externally-fired continuous combustion piston-driven engine configured to employ water injection post-combustion to maintain a temperature of exhaust gas at a set point thereby forming a closed-loop thermal cycle. In some embodiments, the externally-fired continuous combustion piston-driven engine includes at least one pressure-operated compression cylinder exhaust valve. In certain embodiments, the motor vehicle system includes a drive stage, a compression stage and a continuous combustion chamber external to the drive stage and the compression stage.

An illustrative embodiment of a multifuel closed-loop thermal cycle piston engine includes a drive stage coupled to an engine exhaust manifold and including at least one drive cylinder, an intake valve of the at least one drive cylinder operated by a camshaft, a compression stage distinct from the drive stage, the compression stage including at least one compression cylinder, a pressure-operated exhaust valve of the at least one compression cylinder, and the at least one compression cylinder coupled to the at least one drive cylinder by the camshaft, an externally-fired continuous combustion chamber configured to conduct continuous combustion of a fuel in a fuel burner chamber, the externally-fired continuous combustion chamber including a water injection stage succeeding the fuel burner chamber, the water injection stage configured to inject water into the externally-fired continuous combustion chamber post-combustion, and wherein a quantity of water injected into the externally-fired continuous combustion chamber post-combustion is configured to maintain an engine exhaust exiting to the engine exhaust manifold at or below a temperature set point. In some embodiments, each of the drive cylinder and the compression cylinder has a power stroke every 360° rotation. In certain embodiments, gas pressure drives the at least one drive cylinder and the at least one compression cylinder. In some embodiments, water is injected post-combustion until engine exhaust reaches the temperature set point. In certain embodiments, the multifuel closed-loop thermal cycle piston engine further includes an electronic control unit (ECU) configured to control water injection post-combustion such that the engine exhaust remains at or below the temperature set point. In some embodiments, the ECU control is independent of throttle. In certain embodiments, multifuel closed-loop thermal cycle piston engine further includes pre-combustion water injection in the fuel burner chamber configured to reduce NOx emissions. In some embodiments, the temperature set point is 37.78° C. (100° F.). In some embodiments, the exhaust valve pumps air to the burner chamber. In certain embodiments, the pressure-operated exhaust valve includes variable spring pressure configured to provide minimum pressure to open the pressure-operated exhaust valve and maximum pressure to return a valve plug of the pressure-operated exhaust valve to a valve seat during higher RPM operation. In certain embodiments, the externally fired continuous combustion chamber includes a pressure container surrounding an inner combustion liner with a channel therebetween. In some embodiments, a portion of air pumped from the at least one compression cylinder flows through the channel. In some embodiments, the water injection stage includes a series of mixing baffles adjacent to the post-combustion water injection. In certain embodiments, the piston engine is fuel-type independent.

An illustrative embodiment of a method of operating a closed-loop thermal cycle piston engine includes burning fuel in a fuel burner of an externally-fired continuous combustion chamber of a piston engine, measuring a temperature of gas one of exiting a piston engine or at an outlet of an expansion stage (drive stage) of the piston engine, injecting water into the externally-fired continuous combustion chamber post combustion in a water injection stage successive to the fuel burner, and controlling a quantity of the water so injected based on the temperature of the gas so measured, and floating an input to an expansion stage in accordance with work of the piston engine. In some embodiments, the method further includes a pressure-operated exhaust valve exiting a compression stage to the fuel burner. In certain embodiments, the method further includes controlling a fuel input to maintain a pressure of air in an air manifold at a specified limit for any throttle input whereby the fuel input is increased as RPM of the piston engine is increased.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which:

FIG. 3 is a schematic diagram of a continuous combustion piston engine of illustrative embodiments with exemplary pre-combustion water injection.

FIG. 5A is a cross-sectional view of a pressure-operated valve of illustrative embodiments in a closed position during an exemplary downstroke.

FIG. 5B is a cross-sectional view of a pressure-operated valve of illustrative embodiments in a closed position during an exemplary upstroke.

FIGS. 6A-6B are schematic diagrams illustrating exemplary valve and piston timing of an engine of illustrative embodiments.

FIG. 7 is a schematic diagram of an electronic control unit (ECU) of illustrative embodiments.

Figure 1:
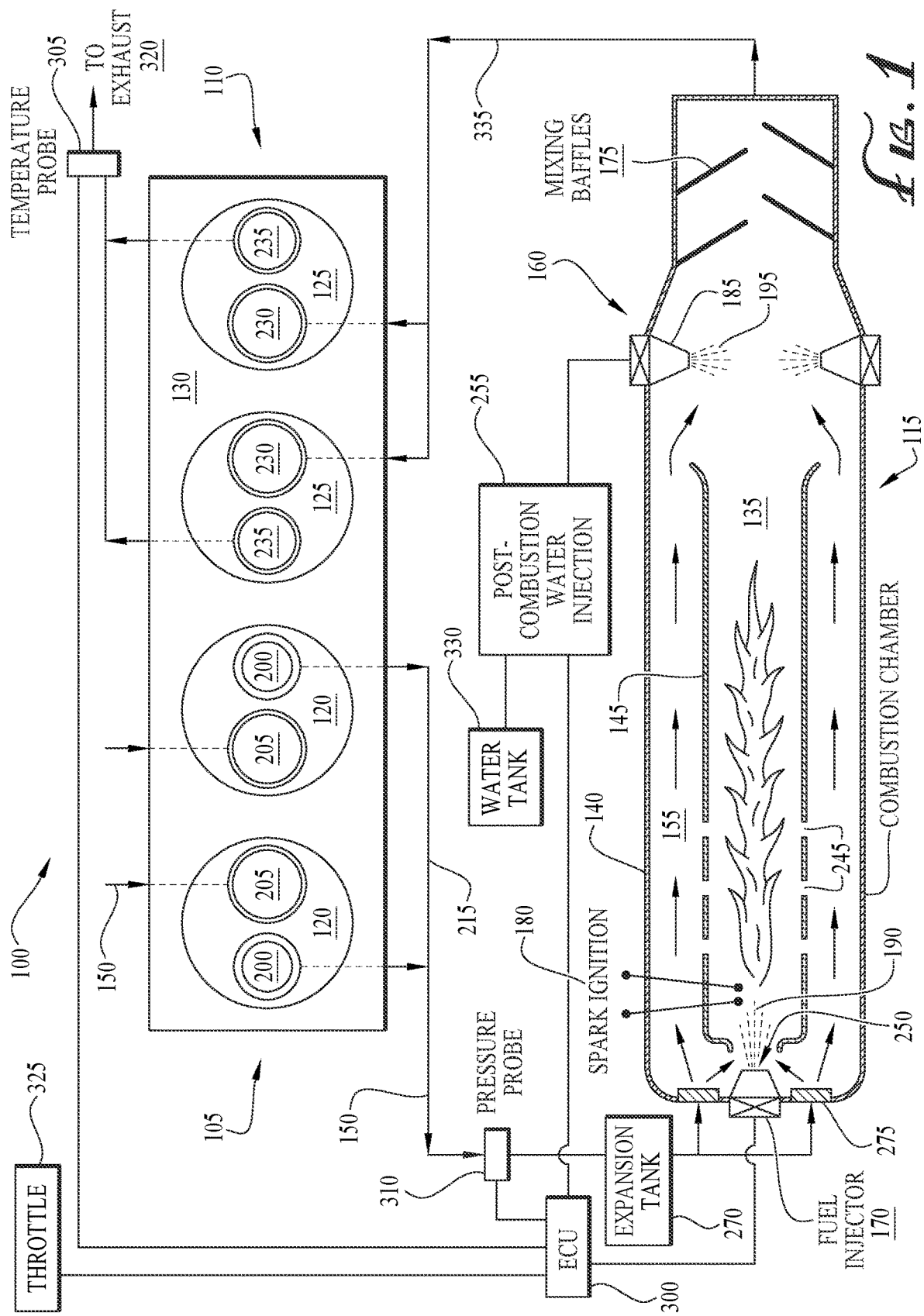
FIG. 1 is a schematic diagram of a continuous combustion piston engine of illustrative embodiments.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A multifuel closed-loop thermal cycle piston engine, system and method will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a sensor includes one or more sensors.

As used in this specification and the appended claims, "coupled" refers to either a direct connection or an indirect connection (e.g., at least one intervening connection) between one or more objects or components. The phrase "directly attached" means a direct connection between objects or components.

As used in this specification and the appended claims, "succeeding" refers to either directly following or indirectly following (e.g., at least one intervening step, object or component) between steps, objects or components.

One or more embodiments of the invention provide a multifuel closed-loop thermal cycle piston engine. While for ease of description and so as not to obscure the invention, illustrative embodiments are described in terms of a two-cylinder to eight-cylinder piston engine for an automotive vehicle, the invention may be applied equally to any system where piston engines are used, for example an aircraft piston engine or a ship employing a piston engine.

Illustrative embodiments may provide an externally fired continuous combustion piston driven engine that uses water injection "post combustion" to transform the maximum amount of thermal energy into gas pressure that drives the piston-type engine of illustrative embodiments. After more than ten years of prototype testing, the inventor has succeeded where countless others have consistently failed, in conceptualizing a working piston engine that recycles thermal energy from exhaust to form a reciprocating type engine having a closed-loop thermal cycle. In doing so, energy that would otherwise be lost as heat may instead be translated into work, which may provide a piston-type engine with an increased fuel efficiency of about 250%. Illustrative embodiments may provide a piston engine that may be capable of interchangeably running on any type of combustible fuel, whether liquid or gas, such as natural gas, liquid hydrogen, diesel, ethanol, gasoline, other similar fuels, or any combination thereof. The fuel efficiency and fuel flexibility of the piston engine of illustrative embodiments may reduce oil dependence, reduce cost, reduce carbon emissions and increase energy sustainability.

The piston engine of illustrative embodiments may include a separate compression stage, a combustion stage and an expansion or drive stage. The combustion may be located outside the engine and employ continuous combustion followed by water injection post-combustion to transform the maximum possible thermal energy into gas at a constant volume and low temperatures into the expansion stage. The compression cylinders and drive cylinders may be of equal size, providing the unexpected result of sufficient forward momentum when such cylinders are incorporated into the piston engine of illustrative embodiments. The intake valves of the drive cylinders and compression cylinders may be camshaft operated, while the exhaust valves of the compression cylinders may be pressure operated. Pressure sensors may be incorporated such that the fuel input is controlled by an electronic control unit (ECU) such that the pressure remains at a specified limit at any throttle input and the fuel may be increased programmatically as the RPM of the engine is increased.

Quantity of water injected into the combustion chamber after the combustion phase may be controlled by the ECU in a feedback loop such that as work is extracted, the energy remaining in the exhaust may be minimized. Energy that may otherwise be lost as heat may instead be put to work. The temperature of the exhaust gas may be held to near ambient (e.g., 37.78° C.) and/or at a setpoint thus minimizing the energy wasted through the exhaust. The input to the expansion stage may therefore be allowed to float in accordance with the work of the engine of illustrative embodiments.

Illustrative embodiments may allow for a maximum amount of thermal energy recycled from exhaust gas, therefore creating a "closed loop thermal cycle". Since the temperatures of the working gas into the expansion stage are low, metallurgical limitations due to high temperatures may be eliminated or minimized. Thermal losses due to absorption of heat into the mechanical parts of the engine may be minimized substantially reducing or eliminating the need for an engine cooling system.

Care should be taken that the continuous combustion engine of illustrative embodiments includes a smooth, continuous air flow to the fuel burner. The manifold design considerations may therefore maximize the decoupling of the cyclic nature of the drive stage from the fuel burner. An expansion tank may be provided between the output of the compressor stage and the burner air input. In some embodiments, the expansion tank may be a two-stage expansion tank. An expansion tank on the drive stage may optionally be included. In some embodiments an expansion tank on the drive stage side may be reduced in size to minimize heat loss and collecting of water, or may be omitted. In certain embodiments, the volume of the expansion tank between the compressor stage and the burner air input may be at least ten times the volume of the cylinders. In some embodiments, the volume of the expansion tank between the compressor stage and the burner air input may be twenty times the cylinder volume.

In some embodiments, pre-combustion water injection in the fuel burner chamber may control combustion temperature and reduce nitrous oxide (NOx) emissions without sacrificing thermal efficiency. Illustrative embodiments may produce maximum torque at minimum RPM and the greatest thermal efficiency may therefore exist in the range the engine of illustrative embodiments is most often used, such as at city driving speeds.

For ease of description and so as not to obscure the invention, illustrative embodiments are shown in terms of a piston engine, but the invention is not so limited and may also be a spark ignited engine, a compression engine, or another similar engine type. Also, for ease of description, illustrative embodiments are shown in terms of a four-cylinder engine. However, those of skill in the art will appreciate that the engine of illustrative embodiments may be any even number of cylinders, for example two, four, six or eight cylinders.

Engine System

Figure 2A:
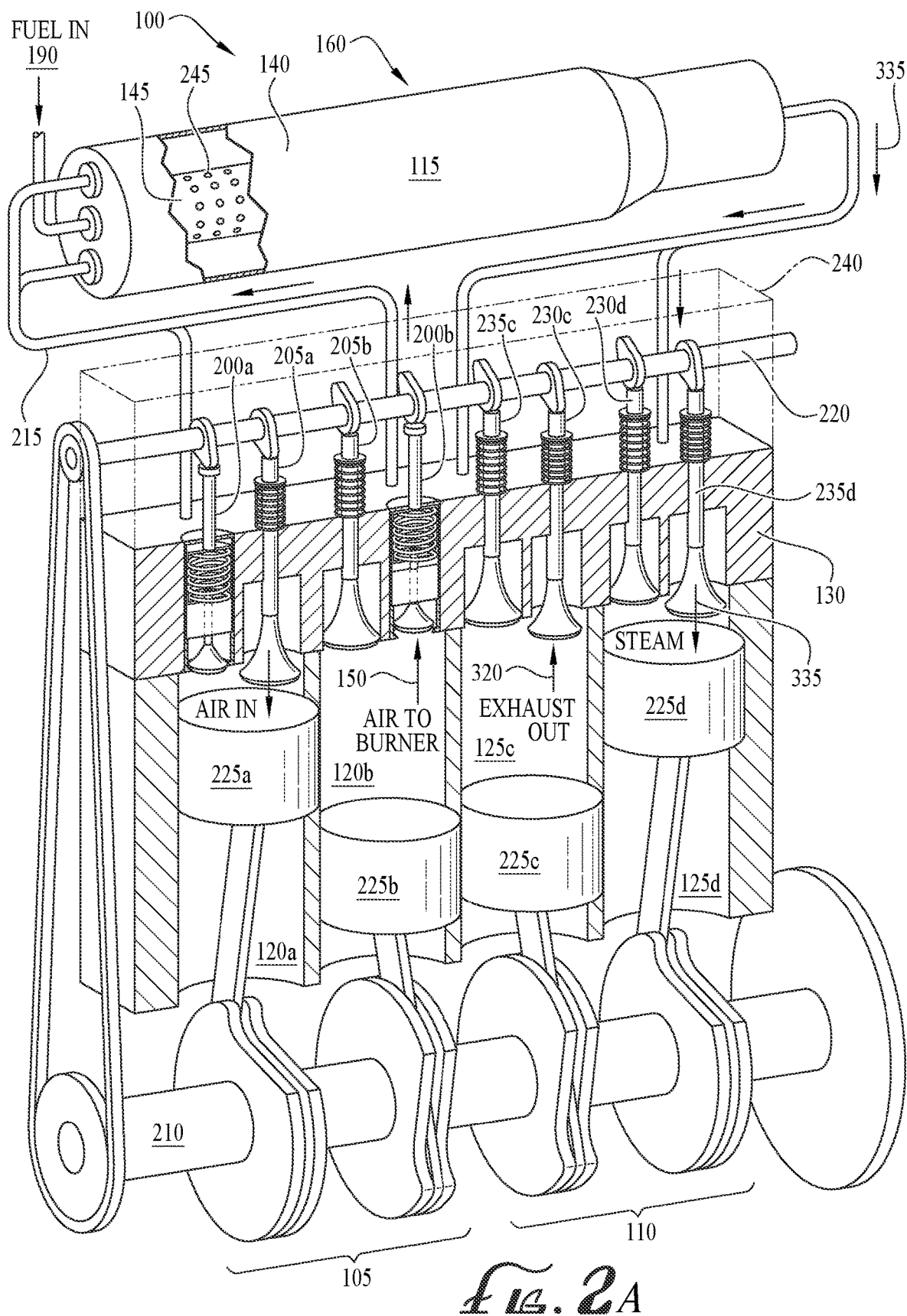
FIGS. 2A-2B are perspective views of an external combustion piston engine of illustrative embodiments.
Figure 2B:
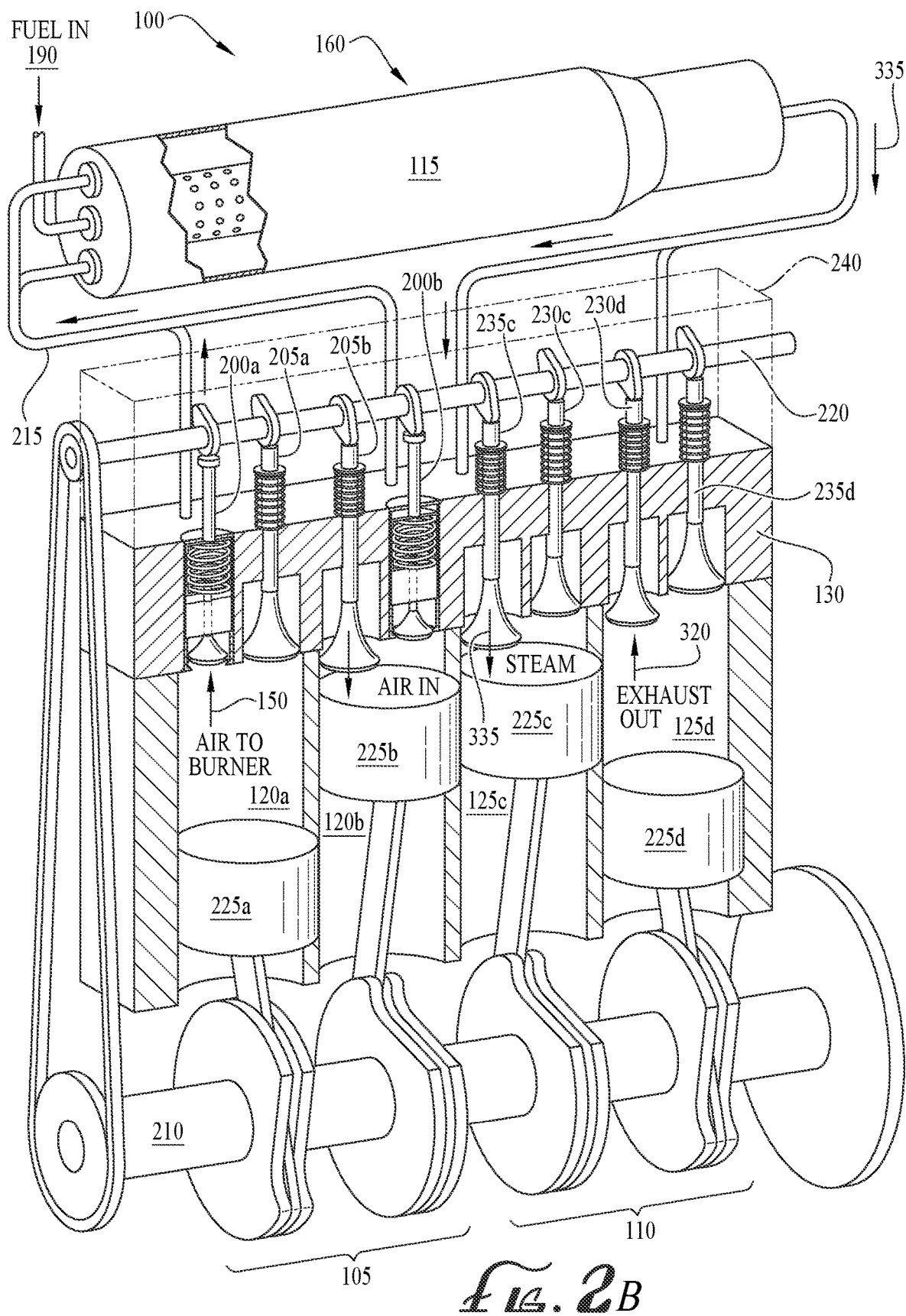

FIG. 1 and FIGS. 2A-2B illustrate an exemplary piston engine of illustrative embodiments. Engine 100 may be a piston driven engine of a size suitable and capacity for a motor vehicle, such as for example a four-cylinder, six-cylinder or eight-cylinder piston engine. Engine 100 may include an inline, horizontally opposed, radial or V-configuration engine block 130. Engine 100 may include compression stage 105, drive stage 110 and combustion stage 115. Compression stage 105 may be separate and distinct from drive stage 110, and more specifically, compression cylinders 120 may be distinct from drive cylinders 125. Steam 335 from combustion stage 115 may actuate drive cylinders 125, depending on which drive intake valve 230 is open. Compression cylinders 120 may pump, move and/or pull fresh air 150 in through compression intake valves 205, and push air 150 back into burner 135 of combustion stage 115 through compression exhaust valves 200.

Compression stage 105 may include one or more compression cylinders 120, and drive stage 110 may include one or more drive cylinders 125. Each compression cylinder 120 may have at least one compression intake valve 205 and at least one compression exhaust valve 200. Each drive cylinder 125 may have at least one drive intake valve 230 and at least one drive exhaust valve 235. Compression exhaust valves 200 may open into head 240, while compression intake valves 205 may open into engine block 130. Each compression cylinder 120 may include one or more compression exhaust valves 200, which may be pressure-operated, and one or more compression intake valves 205. Compression intake valve 205 may be operated by camshaft 220.

Compression exhaust valves 200 of the compression cylinders 120 may pump, move and/or flow air 150 through manifold 215 to burner 135, which may be a burner chamber. Manifold 215 may maximize the decoupling of the cyclic nature of drive stage 110 from fuel burner 135. In some embodiments, an expansion tank 270 on both the burner air input 275 and burner output may be employed to reduce the pulsing nature of the piston operation and provide a smooth flow. Expansion tank 270 may be provided between the output of compressor stage 105 and the burner air input 275. In some embodiments, expansion tank 270 may be a two-stage expansion tank. In some embodiments, an expansion tank on drive stage 110 may not be necessary. In certain embodiments expansion tank 270 on drive stage 110 side may be reduced in size to minimize heat loss and collection of water, rather than being omitted. In certain embodiments, the volume of expansion tank 270 between compressor stage 105 and burner air input 275 may be at least ten times the volume displacement of each compression cylinder and/or drive cylinder 125.

Pressure-operated exhaust valves 200 may establish a pressure profile and thus a volumetric difference between compressor cylinder 120 and drive cylinder 125. Therefore, a constant pressure may be applied to piston 225 of drive cylinder 125 for the full power stroke. Variable spring pressure provided by spring 400 (shown in FIG. 4) may be used to increase RPM operation. Return springs of pressure-operated valves are conventionally a compromise between the minimum pressure needed to open the valve and the RPM operation. Specifically, excessive spring pressure requires high pressure to operate the valve and too low pressure allows the valve to float at higher RPM operation. Illustrative embodiments may provide variable spring pressure to eliminate the compromise considerations of this parameter, thus providing minimum pressure to operate the valve 200 and maximum pressure to return the valve 200 and/or valve plug 500 to valve seat 505 in higher RPM operation.

Compression cylinders 120 may be of equal displacement to drive cylinders 125. The intake valves 205 of compression cylinders 120 may be open on the down stroke. The exhaust valves 205 of the compressor cylinders 120 may be pressure operated such that they are closed until the resulting pressure inside compression cylinder 120 exceeds the pressure in the manifold 215 at which time they may be pushed open by the pressure of the up stroke of piston 225, in a similar fashion to an air compressor.

Figure 5C:
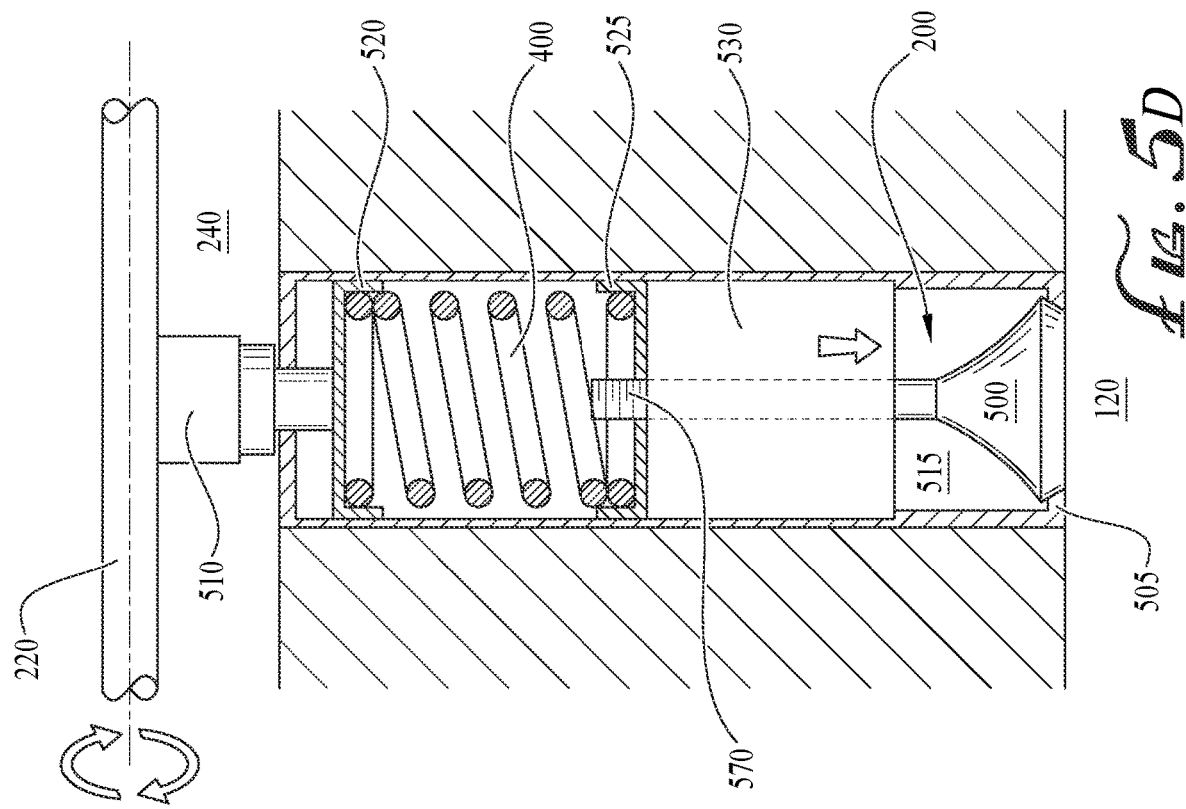
FIG. 5C is a cross-sectional view of a pressure-operated valve of illustrative embodiments in an open position unseated by air pressure during an exemplary upstroke.
Figure 5D:
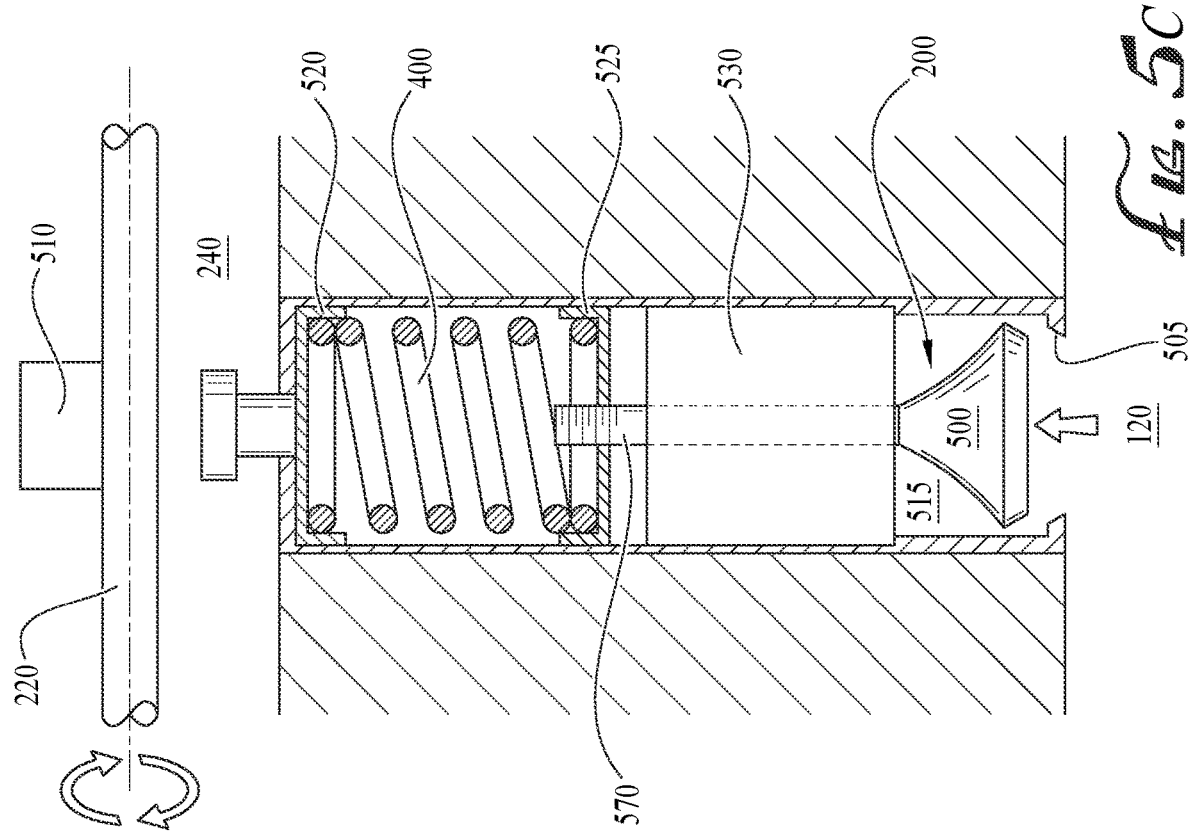
FIG. 5D is a cross-sectional view of a pressure-operated valve of illustrative embodiments closed by spring pressure on an exemplary downstroke.

FIG. 5A-FIG. 5D illustrate exemplary operation of compression exhaust valve 200 of illustrative embodiments. Camshaft 220 may operate only on spring 400 of compression exhaust valve 200 to vary pressure on compression exhaust valve 200, which may allow minimum pressure when piston 225 is on an upstroke such that valve plug 500 may unseat, and may allow maximum pressure when piston 225 is on a downstroke. FIG. 5A illustrates compression exhaust valve 200 in a closed position. In FIG. 5A, camshaft lobe 510 is compressing spring 400, but piston 225 is on a downstroke so compression exhaust valve 200 remains closed. Upper spring retainer 520 and lower spring retainer 525 may retain spring 400 and allow spring 400 to be compressed or extended by camshaft 220 and/or camshaft lobe 510. Valve guide retainer 530 may assist in securing valve stem 570. FIG. 5B illustrates compression exhaust valve 200 during an upstroke of piston 225. In FIG. 5B, spring 400 is extended and therefore valve 200 remains closed. In FIG. 5C, piston 225 is on an upstroke and camshaft 220 is compressing spring 400, allowing minimum pressure such that air pressure unseats valve plug 500 and compression exhaust valve 200 is open. In FIG. 5D, piston 225 is on a downstroke, camshaft 220 compresses spring 400 and compression exhaust valve 200 closes and/or valve plug 500 is seated.

Camshaft 220 may operate only on spring 400 of compression exhaust valve 200 to vary pressure on compression exhaust valve 200, in order to allow minimum pressure when piston 225 is on up stroke and maximum pressure when piston 225 is on down stroke. In the closed position, plug 500 of compression exhaust valve 200 seals against valve seat 505, to place compression exhaust valve 200 in a closed position. In the open position, plug 500 is removed from valve seat 505, to open compression exhaust valve 200 and allow air 150 to escape from compression cylinder 120 through air escape ducts. Minimum pressure may exist during piston 225 up stroke such that air pressure may open compression exhaust valve 200. Maximum pressure may exist on piston 225 down stroke to reseal compression exhaust valve 200. Valve stem 570 may guide plug 500 inside valve chamber 515. Pressure-operated valve operation disclosed herein is exemplary, and other pressure-operated valve systems are similarly contemplated herein. For example, compression exhaust valves 200 of compressor cylinders 120 may be reed valves, poppet valves or another similar air compressor type valve that is pressure-operated. Camshaft 220 may vary the pressure on valve spring 400. Operation of compression stage 105 may be independent of drive stage 110.

Figure 6A:
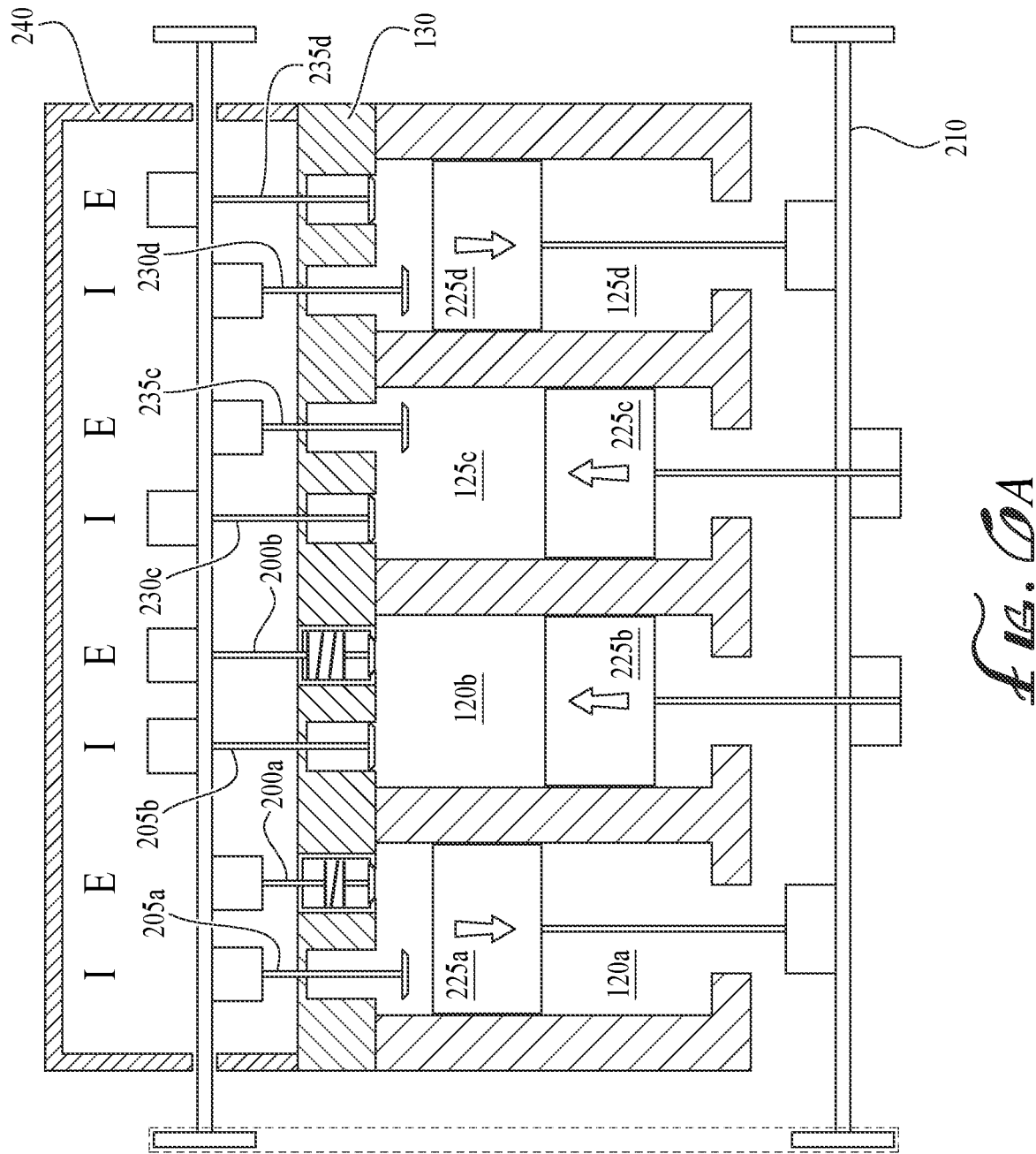

Turning to FIGS. 6A-6B, drive intake valves 230 of drive cylinders 125 may be open on the down (power) stroke and closed on the up stroke. Drive exhaust valves 235 of the drive cylinders 125 may open on the up stroke and closed on the down (power) stroke. The drive cylinder valves 230, 235 may be mechanically operated such that the compressed volume vs. the expanded volume difference between compressor cylinders 120 and drive cylinders 125 establish the forward drive ratio of engine 100. Both of drive exhaust valve 235 and drive intake valve 230 may be operated by camshaft 220.

Figure 4:
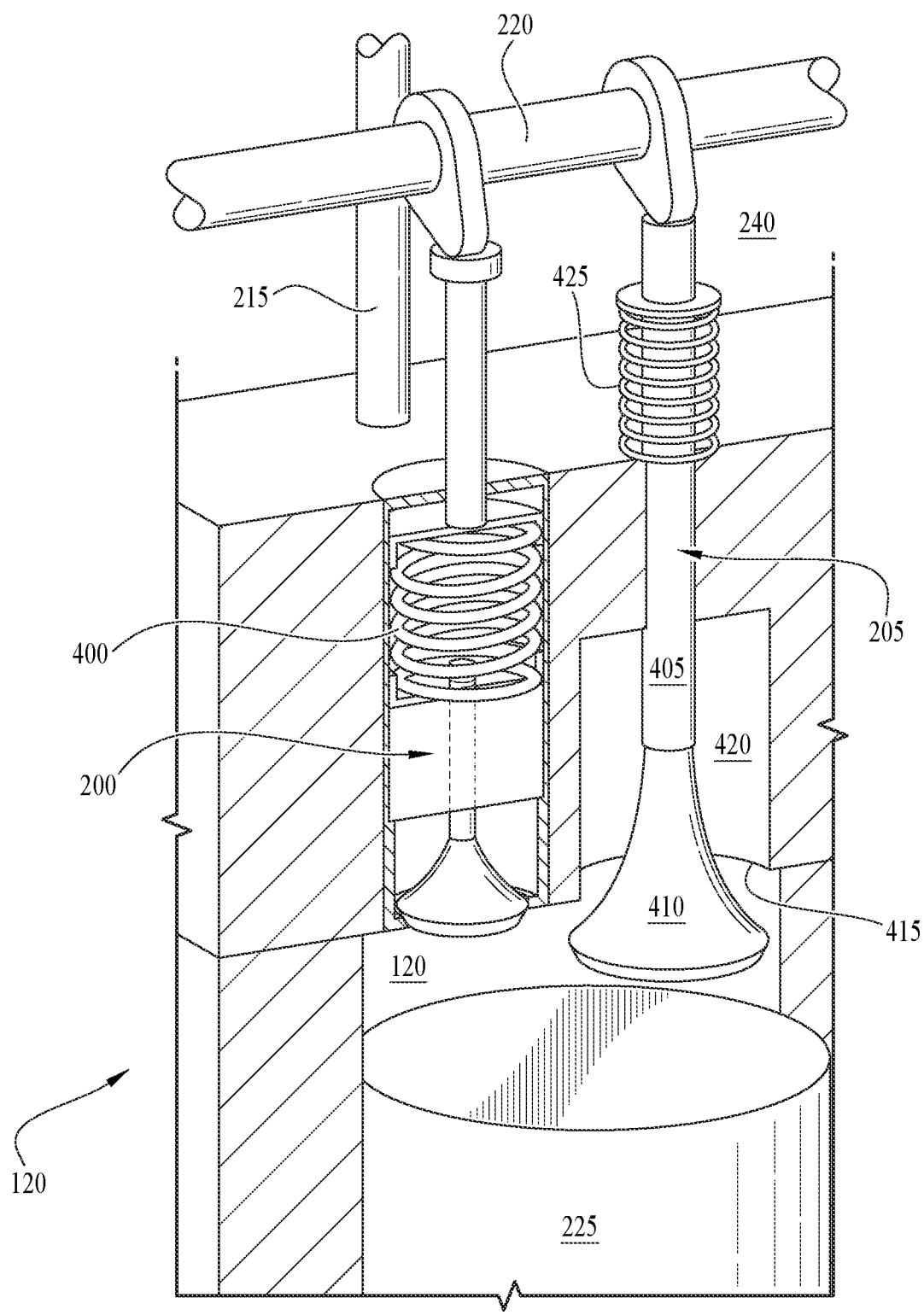
FIG. 4 is a perspective view of exemplary valves of a compression cylinder of illustrative embodiments.

With reference to FIG. 4, compression intake valves 205 may be operated by camshaft 220 and open inside compression cylinder 120 and/or engine block 130, but otherwise may contain similar sealing components to compression exhaust valve 200. For example, as shown in FIG. 4, compression intake valve 205 may include intake valve plug 410, intake valve seat 415, intake valve spring 425, intake valve stem 405 and intake valve chamber 420. FIG. 4 illustrates the structural differences between compression intake valve 205, operated by camshaft 220 and opening into engine block 130, as compared to compression exhaust valve 200, which may be pressure-operated and open into head 240. With respect to compression exhaust valve 200, camshaft 220 may operate only on spring 400 of compression exhaust valve 200, to vary pressure on compression exhaust valve 200. This may allow minimum pressure when piston 225 is on an upstroke and maximum pressure when piston 225 is on a downstroke.

Illustrative embodiments may differ from conventional automotive piston engines in that illustrative embodiments may not employ internal combustion. Instead, combustion stage 115 may be external to compression stage 105 and drive stage 110. In addition, illustrative embodiments may also differ from conventional automotive piston engines in that illustrative embodiments may employ continuous combustion, rather than the conventional intermittent combustion. Combustion stage 115 may, for example, be bolted to head 240 of engine 100. Combustion stage 115 may operate continuous combustion in burner 135 chamber.

Returning to FIG. 1, burner chamber 135 may include an outer pressure container 140 extending around the outer diameter of inner combustion liner 145. Outer pressure container 140 may be a cylinder. Liner 145 may be stainless steel. Burner chamber size and dimensions may vary depending upon the engine type and size. In one nonlimiting illustrative example, for an inline, four-piston engine 100, burner may be 8.89 cm (3.5 inch) in outside diameter with a 3.81 cm (1.5 inch) or 5.1 cm (2.0 inch) inner combustion liner and may be 40.64 cm (16.0 inches) in length. A series of 0.3175 cm (0.125 inch) diameter holes 245 may be placed near the intake end of the burner 135 to improve air flow at higher throttle 325 settings. In one illustrative embodiment, six or eight holes may be placed around liner 145 of burner 135 in three rows. Alternative placement of holes 245 is also contemplated herein.

Fuel 190 may be burned inside combustion liner 145. A portion of air 150 pumped by compressor cylinders 120 may not be needed to support combustion, and instead may flow through channel 155 between combustion liner 145 and outer pressure container 140. Air channel 155 may provide thermal isolation between the pressure container 140 and combustion liner 145. Additional isolation may be provided by injecting a finely atomized water spray 165 (shown in FIG. 3) into channel 155 which may be carried to high temperature end (hot end) 160 of combustion liner 145 by air flow of fresh air 150. Air flow of fresh air 150, post-combustion water 195 and/or atomized water spray 165 may then mix with the high temperature gasses at outlet of the combustion liner 145 by a series of baffles 175 placed at hot end 160 of combustion stage 115.

Burner chamber 135 of combustions stage 115 may include fuel inlet 250 and spark ignition 180 to provide for continuous combustion within burner chamber 135. Spark plug may be an automotive spark plug known to those of skill in the art with a spark generated by an existing magneto in engine 100. In some embodiments, a spark may be generated with an automotive ignition coil. The primary may be driven with a transistor amplifier. The signal provided to the amplifier may be provided by a Hall effect transducer (not shown) located on the harmonic balancer. The Hall effect transducer may also provide an RPM signal to the tachometer.

Illustrative embodiments may include water injection post-combustion, which may create steam 335 to drive cylinders 125 and/or may utilize heat which would otherwise be wasted through exhaust 320. Water injectors 185 and mixing baffles 175 may be placed at the outlet of combustion liner 145 at hot end 160 of burner chamber 135. ECU 300 may control water injection. Water injectors 185 may be electrically controlled by varying pulse width, for example, 0 to 5 Volts to the flow control valve of water injectors 185. Three water injectors 185 may be placed at 60-degree angles around the burner outlet forward of baffles 175 placed strategically to provide proper cooling. In some embodiments, a single water injector 185, two water injectors 185, four water injectors 185, or another number of water injectors 185 may be placed around the burner outlet forward of baffles 175 and/or may be spaced around the burner outlet. Water 195 to water injectors 185 may be supplied from water tank 330. In some embodiments, water 195 may be purified water. Air 150 may be pumped by compression cylinders 120 into external combustion stage 115 where fuel 190 may be burned. After combustion, water 195 may then be injected into the heated gasses at the outlet hot end 160 and/or post-combustion end of burner chamber 135, thereby creating steam 335. This steam 335 pressure together with the gasses produced by the combustion may propel drive cylinders 125.

Fuel injector 170 may be an automobile electrically actuated common rail injector. In some embodiments, fuel injector 170 may be fuel injectors of the type used is a 2012 Ford 3.5 eco boost turbo engine. The amount of fuel may be determined by the pulse width, for example a pulse frequency of about 60 Hz. The throttle 325 input to the ECU 300 may be compared with the pressure input from pressure probe 310, such as for example a pressure transducer. The pressure limit provided in the ECU may limit the fuel input. Fuel pressure may be provided by an automotive fuel pump, such as the type used with rail injectors. In some embodiments, a fuel pump with higher pressure, for example a pan, may regulate the pressure at about 400 PSI. Bypass regulator valves on the fuel and water pumps may be set at 400 PSI. In certain embodiments, pumps may be belt-driven hydraulic gear pumps. In some embodiments, diesel electrically driven common rail injectors such as the type used in a power stroke diesel engine may be employed. The water injectors may also be similar. The water control may be provided by the ECU 300, where ECU 300 may be programmed to control the amount of water injected such that the water injection will result in a near ambient exhaust temperature.

Mixing baffles 175 may be placed at hot end 160 of the outlet to burner chamber 135 just after post combustion water injection to provide homogeneous mixing and cooling of the gasses. Cooling of baffles 175 may be provided by water 195. The baffles 175 may be angled, such as at 300 or 45°, in the flow to create an eddy to maximize thermal mixing.

Electronic Control Unit (ECU)

Electronic Control Unit (ECU) 300 may be implemented as an embedded computer system or other digital component system. During the inventor's experimentation, the functions of the ECU were implemented using analog devices including an analog comparator connected to a saw-tooth generator that was used to create a variable pulse width to control, for example, the input voltage of a flow rate transducer to control the amount of water injected by water injectors 185. For production implementation, however, a digital solution is contemplated which may employ input voltages from sensors to a Central Processing Unit, Digital Signal Processor (DSP), Gate Array, Programmable Logic Controllers (PLCs), ASIC (Application Specific Integrated Circuit), FPGA (Field Programmable Gate Array) or any other digital control device such as CPU 700 depicted in FIG. 7. While a common embedded system type arrangement is discussed, any implementation that would provide independent programmable control functions may be used to implement the functions of ECU 300. The invention is not limited to any particular digital or analog hardware configuration so long as the configuration provides the capabilities and/or algorithms ascribed to ECU 300 as described herein.

FIG. 7 illustrates the common elements of an embedded control system of illustrative embodiments such as ECU 300. CPU 700 may be a central processing unit capable of accepting digital input signals and outputting digital signals to external devices. Input and output of control signals may be achieved using a bus such as IO (input output) bus 710. IO bus 710 may be a serial, synchronous serial, universal or other appropriate communication bus fit for the purpose. Digital binary signals, such as Built In Test (BIT) indicator 720 or reset signal 730 may be directly connected to CPU 700, or connected in any other method available for CPU 700. CPU 700 may also support an output FAIL indicator 740 that may provide an external display 735 or central control system with indication of a fatal problem in ECU 300. CPU 700 may be connected to both Non-Volatile Memory 760 and Random-Access Memory (RAM) 770 to provide CPU 700 with executable control program 800, constants, programmatic limits, registers, and other required elements, though implementation using Gate Array, EEPROM, flash memory or other similar technology may alter this configuration to achieve similar results and is within the scope of illustrative embodiments contemplated herein. CPU 700 may contain or have access to one or more timers 780 which may be used to clock signals as well as run tasks at a given Hertz rate to measure values from the input sources, as well as control outputs to output devices. Where input and/or output devices are analog, CPU 700 may also have access to some type of Analog to Digital converters (A/D) or Digital to Analog converters (D/A), or ADC/DAC, or similar circuitry well-known to those of skill in the art in the field of electronics and embedded systems.

Control Algorithm

Figure 8:
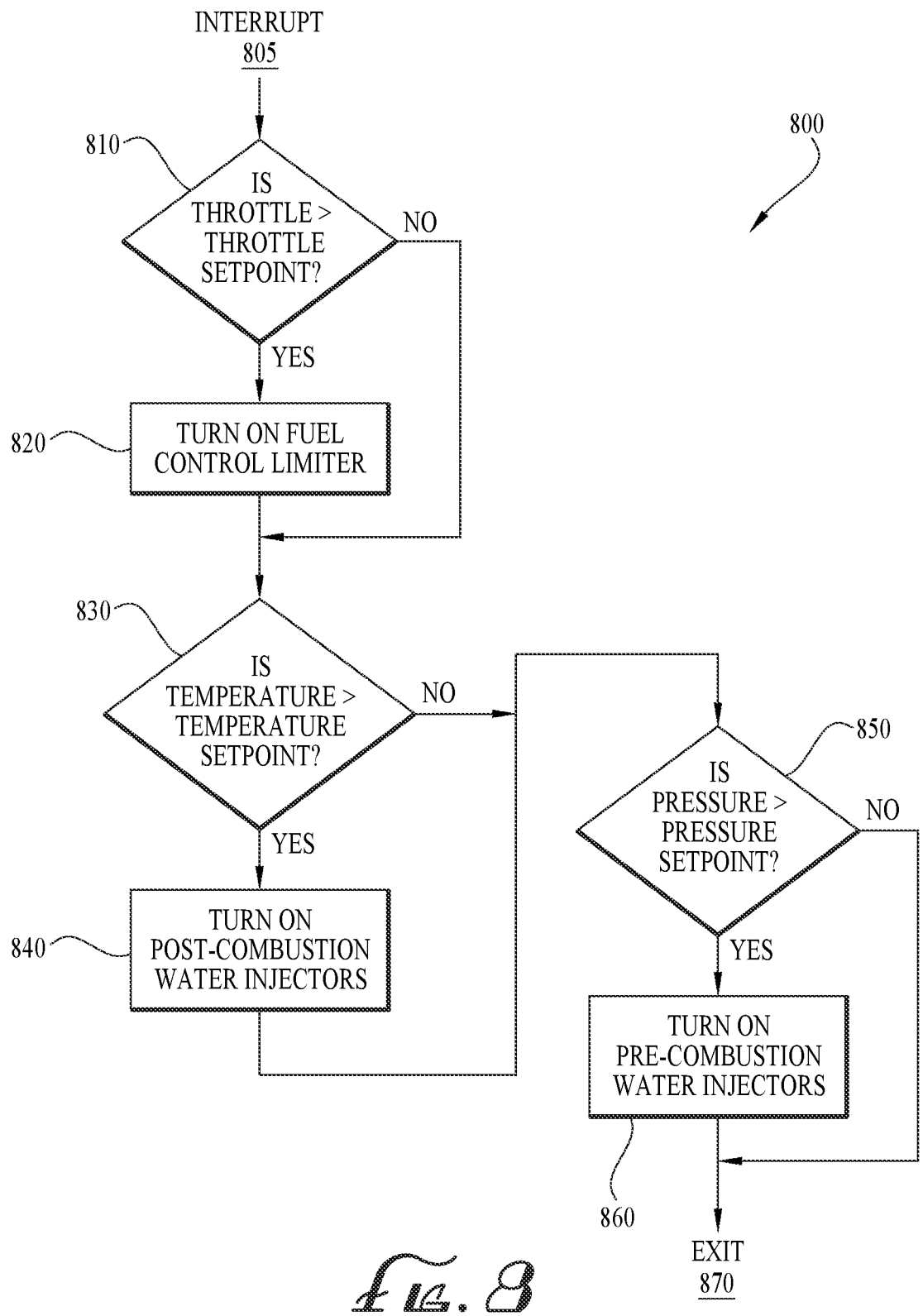
FIG. 8 is a flowchart of a control algorithm of illustrative embodiments for controlling water and fuel injection in the engine of illustrative embodiments.

ECU 300 may implement an executable software control program and algorithm 800, for example, whose program flow may be as shown in FIG. 8. Software control program 800 may be embedded in ECU 300 and programmed to control pre-combustion water injectors 260 and/or post-combustion water injectors 255. Another output of software control program 800 may be to signal fuel control limiter 745, which may communicate with fuel injectors 170 when needed to control the cold pressure of the exhaust gasses to a prescribed limit, which may be less than about 140 PSI as described elsewhere herein. Inputs to control program 800 may include system pressure, such as a reading from one or more pressure probes 310. Another input to control program 800 may be from throttle 325, and from one or more temperature sensors such as temperature probe 305.

The ECU 300 control algorithms for fuel and water injection may be as illustrated in FIG. 8. Fuel injection 190 may be regulated by information obtained from pressure probe 310, which may monitor the air pressure of air 150 in manifold 215. Water injector 185 may be regulated by information obtained from temperature probe 305, which may monitor the temperature of exhaust gas 320 exiting engine 100. For example, water 195 may be injected into high temperature end 160 of burner chamber 135 so as to maintain exhaust gas 320 at about 37.78° C. (100° F.). Similarly, fuel 190 may be injected so as to limit air 150 pressure in manifold 215 at a setpoint about less than 140 PSI. Specific temperature and pressure set points described herein are illustrative. The pressure setpoint may be based on the practical limit imposed due to the reduced volume of the compressed air. For example, at 140 PSI the volume is about 10% of the cylinder volume. Pressure of about 125-140 PSI may be a practical limit due to small compressor volume. However, this limit may be increased by "supercharging," air input into the compressor cylinder. The temperature setpoint may be based on a maximization of energy used. If a setpoint that is too low is used it may result in liquid water being discharged from the exhaust, and in such instance increased water injection may not result in increased RPM or pressure. A temperature setpoint that is set too high may result in wasted heat in the exhaust.

In FIG. 8, an illustrative embodiment of the programmatic flow control of illustrative embodiments is shown. For ease of description and so as not to obscure the invention, specifics of an operating system for the embedded system is left to the reader as such implementations are well-known in the art. At least one embodiment of the inventive algorithm that may be executed on one or more embodiments of the system of FIG. 7 is next described. Running at a regular interval from CPU 700 interrupt, such as 100 MHz interrupt 805, or some interval that may or may not be a power of 2, the software may test throttle 325, pressure sensor 715 and/or temperature probe sensor 305 inputs. These input values may control the task flow of software control algorithm 800 such that software control algorithm 800 responsively controls outputs to fuel injectors 170 (through fuel control limiter 745), pre-combustion water injectors 260 and post-combustion water injectors 255. These responsive values may be applied to maintain the desired environment for burner 135, as follows.

Interrupt 805 transfers control from the operating system to algorithm of control program 800 at Step 810 of FIG. 8. Throttle 325 input may produce a variable DC pulse width. Step 810 may compare the value of throttle 325 with a standard function generator (digital or analog) value to determine the PSI of engine 100. Throttle 325 may have, for example, a variable pulse range representing 0-12 Volts. If the throttle 325 pressure exceeds the setpoint (as determined when configuring the system of the invention), control program 800 of illustrative embodiments may make the decision at step 810 to turn on fuel control limiter 745 at Step 820 to keep the pressure below the setpoint. If the pressure does not exceed the setpoint, program 800 may do nothing, or in some embodiments may turn off the fuel control limiter 745. In either case, control program 800 may continue on to the test at step 830.

At Step 830, control program 800 of illustrative embodiments may examine the value of pressure sensor 715, for example, Type-K thermocoupler 715, as modified perhaps by the value of temperature amplifier 725 to about, for example, 0-12 V representing temperatures of the exhaust from −17.78-815.56° C. (0-1500° F.) at the output of drive stage 110. If the temperature of the exhaust does not exceed the setpoint (of, for example, 37.78° C. (100° F.) or about ambient) then the program may do nothing, or may turn off post-combustion water injectors 255, and may then proceed to Step 850. If the temperature does exceed the setpoint, then the program may continue to Step 840 and may turn on post-combustion water injectors 255. In some embodiments, common rail injectors, such as post-combustion water injectors 225, may be controlled by managing a variable pulse width that turns them on or off.

At Step 850, the program also tests a pressure probe, such as pressure transducer 310, which may be constructed in a similar circuit as described above, and that may provide guidance to control pre-combustion water injectors 260. Pressure transducer 310 may be connected to a buffer amplifier to rescale its 0-5 V value to 0-12 V to facilitate comparison to throttle 325. Pressure transducer 310 may be located at the output of the compressor stage or at the cold end of fuel burner 135. A value of, for example, 0-5 Volts may represent pressures of 0-150 PSI, for example. If the pressure exceeds the setpoint, control program 800 of illustrative embodiments may proceed to Step 860 to turn on pre-combustion water injectors 260. If the pressure does not exceed the setpoint, the program may continue to Step 870, where it either does nothing, or may turn off the pre-combustion water injectors 260, depending on the configuration of the injectors. At Step 870, the program thread may exit and return control of CPU 700 to the operating system (the idle task).

While idle, the operating system executing on CPU 700 may perform various Built-In-Tests (BIT) to determine validity of various inputs. The BIT aspects of the program may also determine if the output controls are altering the temperature and/or pressure as desired. If the BIT task of the idle program cannot determine inputs or see effect of its outputs, it may set fail indicator 740 and disable interrupt 805 controlling the processing task. If the idle task receives reset signal 730 it may reboot, reloading the program and all setpoint values from non-volatile or EEPROM or other non-volatile memory 760 and re-enable interrupt 805.

Engine Strokes

Pressure developed in burner chamber 135 may only be reached by compressor cylinders 120 near the top of the stroke where maximum mechanical advantage of crankshaft 210 rotation may be reached. Conversely the pressure applied to drive cylinders 125 may be maximized during the full stroke or at least to the point of their maximum velocity and mechanical advantage of crankshaft 210 rotation is reached. The difference of this pressure profile may widen as pressure is increased due to the power developed by the fuel 190 combustion being applied to the resistance of the torque load.

FIG. 2A-2B illustrate exemplary strokes of an engine 100 of illustrative embodiments. FIGS. 6A-6B illustrate exemplary valve positions of the engine strokes of illustrative embodiments. As illustrated in FIG. 2A and FIG. 6A, piston 225a of compression cylinder 120a is moving in a downstroke. Compression intake valve 205a is open and allowing ambient air 150 to enter compression cylinder 120a. Compression exhaust valve 200a is closed. Piston 225b is moving in an upstroke, which causes air 150 from compression cylinder 120b to be pumped, moved and/or pushed through open compression exhaust valve 200b and into manifold 215, which air 150 may continue on to burner 135 of combustion stage 115. Compression intake valve 205b is closed. At the same time, piston 225c of drive cylinder 125c is also moving in an upstroke. Exhaust 320 may be moved by piston 225c through drive exhaust valve 235c, which is open. The temperature of exhaust 320 may be measured by temperature probe 305 before exiting engine 100 through an exhaust pipe. Drive intake valve 230c may be closed. Drive intake valve 230d may be open, and steam 335 exiting combustion chamber 115 may be pulled into drive cylinder 125d. Drive exhaust valve 235d may be closed.

As illustrated in FIG. 2B and FIG. 6B, piston 225a of compression cylinder 120 is beginning an upstroke. Compression intake valve 205a is closed, and air 150 is being moved from compression cylinder 120, through compression exhaust valve 200a into manifold 215 towards combustion chamber 115. Piston 225b is beginning a downstroke, pulling air in through open compression intake valve 205b. Compression exhaust valve 200b is closed. Piston 225c of drive cylinder 125 is also beginning a downstroke, drawing steam 335 into drive cylinder 125c through drive intake valve 230c. Drive exhaust valve 235c is closed. Piston 225d of drive cylinder 125d is beginning an upstroke, sending exhaust 320 out through drive exhaust valve 235d. Drive intake valve 230d is closed.

Illustrative embodiments may be applied to a two-stroke, four-stroke or six stroke design. In some embodiments, each of the drive cylinder and the compression cylinder may have a power stroke every 360° rotation.

Post-Combustion Water Injection

Post combustion water injection 255 may transform thermal energy into working gasses as well as reduce internal temperatures. ECU 300 may control water injection. Temperature probe 305, such as a temperature monitoring thermocouple may be located between mixing baffles 175 and input to drive stage 110 and/or output of drive stage 110, and provide gas temperature information to ECU 300. By controlling post combustion water injection using ECU 300 in a feedback loop with temperature probe 305 that may be placed at the inlet of the drive cylinders 125 or at exhaust 315 of drive cylinders 125 such that the temperature of the gasses discharged from exhaust 320 may be minimized (usually less than 100° F.), engine 100 may operate at maximum possible thermal efficiency. Illustrative embodiments may provide a closed loop system. ECU 300 may exercise full authority and be independent of throttle 325. Instead ECU 300 may instruct water 195 to be injected as a function of the temperature of the gasses monitored at the output of the drive cylinder 125. This temperature setpoint is modulated in accordance with an algorithm embedded in ECU 300 that may cause the exhaust gas temperature to be at the lowest possible point at any torque load or throttle input.

ECU 300 may also maintain control fuel 190 input to combustion burner 135. The fuel input may be limited as a function of pressure to prevent over-fueling at lower RPMs. Thus, at high throttle 325 demand the fuel 190 input to the burner 135 will increase to maintain the maximum pressure limit or throttle demand whichever is less. Since this is also a function of the thermal energy of the fuel varying fuel energies may not affect the engine performance. Thus, any mixture of ethanol or fossil fuels, either liquid or gas may produce no noticeable effect on engine performance.

Pre-Combustion Water Injection

FIG. 3 illustrates an exemplary embodiment showing pre-combustion water injection. Pre-combustion water injection 260 in the fuel burner chamber may control combustion temperature and reduce nitrous oxide (NOx) emissions without sacrificing thermal efficiency. A finely atomized water spray 165 (shown in FIG. 3) into channel 155 which may be carried to high temperature end 160 of combustion liner 145 by air flow 150, where it may then be mixed with the high-temperature gasses at outlet of the combustion liner 145 by a series of baffles 175 placed at the high temperature end 160 of combustion stage 115. Similarly to water injectors 185, ECU 300 may control pre-combustion water injection 260. Pre-combustion water injector 265 may be electrically controlled by varying pulse width, for example, 0 to 5 Volt flow control valve pre-combustion water injectors 265. One or a plurality of water injectors 265 may be disbursed around the burner proximate fuel injector 170. Water 195 to pre-combustion water injectors 265 may be supplied from water tank 330.

A multifuel closed-loop thermal cycle piston engine, system and method has been described. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

The invention claimed is:

1. A multifuel closed-loop thermal cycle piston engine comprising:
    an externally-fired continuous combustion chamber configured to conduct continuous combustion of a fuel in a fuel burner chamber, the externally-fired continuous combustion chamber comprising a water injection stage succeeding the fuel burner chamber, the water injection stage configured to inject water into the externally-fired continuous combustion chamber post-combustion;
    a drive stage coupled to an engine exhaust manifold and comprising at least one drive cylinder;
    a compression stage distinct from the drive stage, the compression stage comprising at least one compression cylinder, and a pressure-operated exhaust valve of the at least one compression cylinder wherein the pressure-operated exhaust valve pumps air to the fuel burner chamber and comprises a variable pressure spring configured to provide minimum pressure to open the pressure-operated exhaust valve and maximum pressure to return a valve plug of the pressure-operated exhaust valve to a valve seat during higher RPM operation; and
    wherein a quantity of water injected into the externally-fired continuous combustion chamber post-combustion is configured to maintain an engine exhaust exiting to the engine exhaust manifold at or below a temperature set point.

2. The multifuel closed-loop thermal cycle piston engine of claim 1, wherein gas pressure drives the at least one drive cylinder and the at least one compression cylinder.

3. The multifuel closed-loop thermal cycle piston engine of claim 1, wherein the water is injected post-combustion until engine exhaust reaches the temperature set point.

4. The multifuel closed-loop thermal cycle piston engine of claim 3, further comprising an electronic control unit (ECU) configured to control the water injection post-combustion such that the engine exhaust remains at or below the temperature set point.

5. The multifuel closed-loop thermal cycle piston engine of claim 4, wherein the ECU control is independent of throttle.

6. The multifuel closed-loop thermal cycle piston engine of claim 1, further comprising pre-combustion water injection in the fuel burner chamber configured to reduce NOx emissions.

7. The multifuel closed-loop thermal cycle piston engine of claim 1, wherein the temperature set point is 37.78° C. (100° F.).

8. The multifuel closed-loop thermal cycle piston engine of claim 1, wherein the externally-fired continuous combustion chamber comprises a pressure container surrounding an inner combustion liner with a channel therebetween.

9. The multifuel closed-loop thermal cycle piston engine of claim 8, wherein a portion of air pumped from the at least one compression cylinder flows through the channel.

10. The multifuel closed-loop thermal cycle piston engine of claim 1, wherein the water injection stage comprises a series of mixing baffles adjacent to the post-combustion water injection.

11. The multifuel closed-loop thermal cycle piston engine of claim 1, wherein the piston engine is fuel-type independent.

12. A method of operating a closed-loop thermal cycle piston engine, comprising:
    burning fuel in a fuel burner of an externally-fired continuous combustion chamber of a piston engine;
    measuring a temperature of gas one of exiting the piston engine or at an outlet of a drive cylinder of the piston engine;
    injecting water into the externally-fired continuous combustion chamber post combustion in a water injection stage successive to the fuel burner;
    controlling a quantity of the water so injected based on the temperature of the gas so measured;
    floating an input to an expansion stage in accordance with work of the piston engine; and
    controlling a fuel input to maintain a pressure of air in an air manifold at a specified limit for any throttle input whereby the fuel input is increased as RPM of the piston engine is increased.

13. The method of claim 12, further comprising comparing the throttle input with a standard function generator value to determine the pressure of air in the air manifold.

14. The method of claim 12, further comprising turning on a fuel control limiter when a pressure sensor value is greater than a pressure setpoint.

15. The method of claim 12, further comprising turning on the post-combustion water injectors when the temperature is greater than a temperature setpoint.

* * * * *